United States Patent
Pisasale et al.

(10) Patent No.: US 10,742,406 B2
(45) Date of Patent: Aug. 11, 2020

(54) KEY GENERATION AND SECURE STORAGE IN A NOISY ENVIRONMENT

(71) Applicant: Micron Technology, Inc., Boise, ID (US)

(72) Inventors: Michelangelo Pisasale, Catania (IT); Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 177 days.

(21) Appl. No.: 15/970,660

(22) Filed: May 3, 2018

(65) Prior Publication Data
US 2019/0342090 A1 Nov. 7, 2019

(51) Int. Cl.
*G06F 21/00* (2013.01)
*H04L 9/08* (2006.01)
*H04L 9/06* (2006.01)

(52) U.S. Cl.
CPC .......... *H04L 9/0866* (2013.01); *H04L 9/0643* (2013.01); *H04L 9/0894* (2013.01); *H04L 2209/16* (2013.01)

(58) Field of Classification Search
CPC ....... H04L 9/0866; H04L 9/0643; H04L 9/08; H04L 2209/16; G06F 21/72; G06F 21/86
See application file for complete search history.

(56) References Cited

U.S. PATENT DOCUMENTS

| | | | | |
|---|---|---|---|---|
| 7,818,569 | B2* | 10/2010 | Devadas | G06F 21/31 713/168 |
| 8,667,265 | B1* | 3/2014 | Hamlet | H04L 9/0866 326/80 |
| 8,699,714 | B2* | 4/2014 | Tuyls | H04L 9/0866 380/278 |
| 8,750,502 | B2* | 6/2014 | Kirkpatrick | H04L 9/0866 380/44 |
| 9,430,406 | B2 | 8/2016 | Van Der Sluis et al. | |
| 9,537,653 | B2* | 1/2017 | Komano | H04L 9/0861 |
| 9,584,329 | B1 | 2/2017 | Trimberger | |
| 2012/0045061 | A1 | 2/2012 | Danger et al. | |
| 2012/0183135 | A1* | 7/2012 | Paral | H04L 9/0866 380/44 |
| 2017/0149573 | A1* | 5/2017 | Sadhasivan | G06F 21/14 |

OTHER PUBLICATIONS

International Search Report and Written Opinion, PCT/US2019/028356, dated Aug. 6, 2019.
Roel Maes, "Physically Unclonable Functions: Constructions, Properties and Applications", Doctoral and postdoctoral thesis, pp. 1-234, Aug. 31, 2012, https://www.base-search.net/Record/ae7cca d56dfbf4a5345aadb6cacb19fdce3bd87b520779018db67085ea7 44412.

* cited by examiner

*Primary Examiner* — Hosuk Song
(74) *Attorney, Agent, or Firm* — Greenberg Traurig

(57) ABSTRACT

A method implemented in a computing device includes: generating an initial key from key injection or based on a value provided by at least one physical unclonable function (PUF); generating an obfuscated key based on the initial key; and storing the obfuscated key in a non-volatile memory.

16 Claims, 9 Drawing Sheets

KEY GENERATION AND SECURE STORAGE IN A NOISY ENVIRONMENT

RELATED APPLICATIONS

This application is related to U.S. Non-Provisional application Ser. No. 15/853,498, filed Dec. 22, 2017, entitled "PHYSICAL UNCLONABLE FUNCTION USING MESSAGE AUTHENTICATION CODE," by Mondello et al., the entire contents of which application is incorporated by reference as if fully set forth herein.

This application is also related to U.S. Non-Provisional application Ser. No. 15/965,731, filed 27 Apr. 2018, entitled "SECURE DISTRIBUTION OF SECRET KEY USING A MONOTONIC COUNTER," by Mondello et al., the entire contents of which application is incorporated by reference as if fully set forth herein.

FIELD OF THE TECHNOLOGY

At least some embodiments disclosed herein relate to key generation in general and more particularly, but not limited to key generation and secure storage in a noisy environment.

BACKGROUND

A physical unclonable function (PUF) provides, for example, a digital value that can serve as a unique identity for a semiconductor device, such as a microprocessor. PUFs are based, for example, on physical variations which occur naturally during semiconductor manufacturing, and which permit differentiating between otherwise identical semiconductor chips.

PUFs are typically used in cryptography. A PUF can be, for example, a physical entity that is embodied in a physical structure. PUFs are often implemented in integrated circuits, and are typically used in applications with high security requirements. For example, PUFs can be used as a unique and untamperable device identifier. PUFs can also be used for secure key generation, and as a source of randomness.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
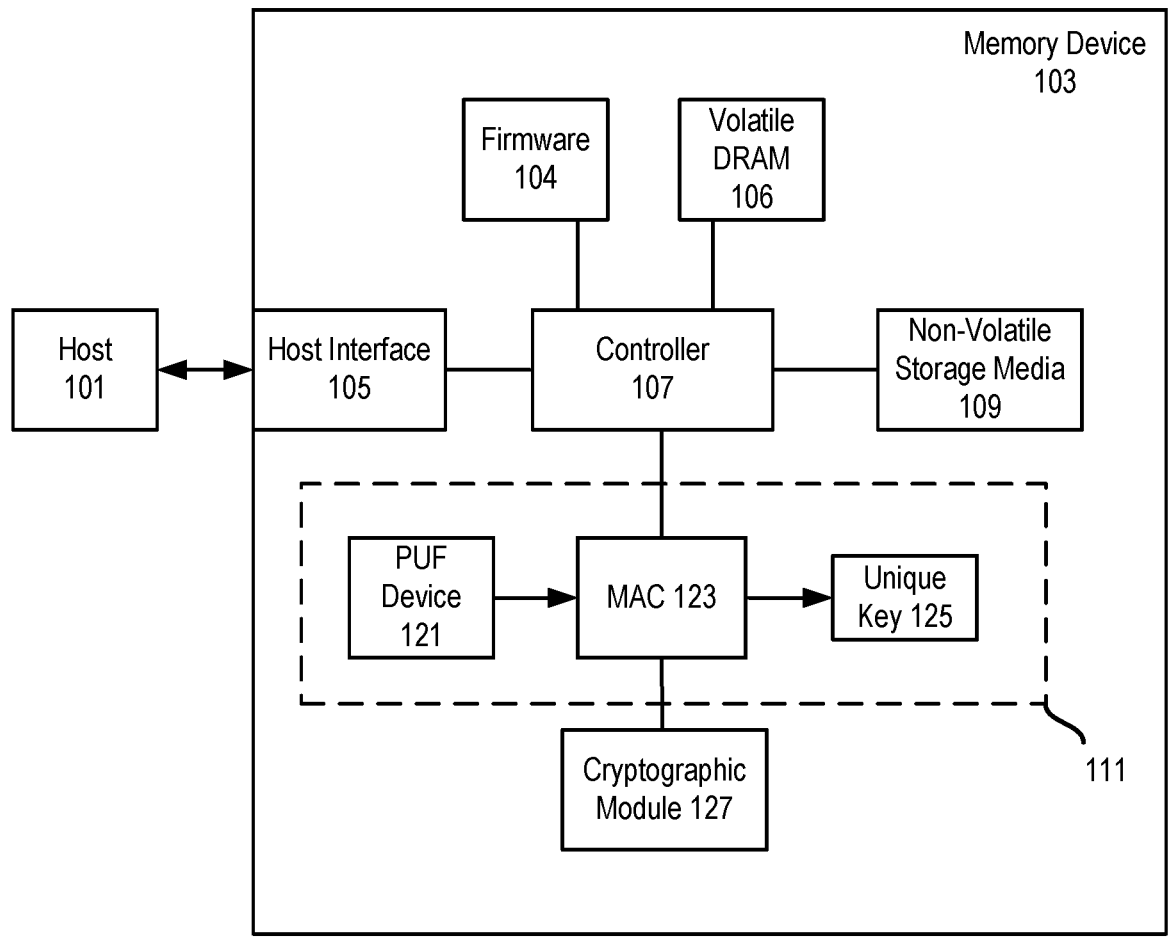
FIG. 1 shows a system for generating a unique key from an output of a message authentication code (MAC) that receives an input from a physical unclonable function (PUF) device, according to one embodiment.

At least some embodiments disclosed herein provide an improved architecture for generating physical unclonable function (PUF) values. In general, the architecture generates an output by feeding inputs provided from one or more PUFs into a message authentication code (MAC). The output from the MAC provides the improved PUF.

In general, semiconductor chip manufacturers face the problem of key injection, which is the programming of a unique secret key for each chip or die, for example, provided from a semiconductor wafer. It is desired that key injection be performed in a secure environment to avoid leaking or disclosing the secret keys injected into the chips. It is also desired to ensure that the key cannot be hacked or read back after production of the chip. In some cases, for example, key injection procedures are certified or executed by a third-party infrastructure.

Chip manufacturers desire to reduce the production cost of chips that include cryptographic capabilities. Chip manufacturers also desire to simplify production flows while maintaining a consistent level of security performance of the manufactured chips. However, key injection is one of the more expensive production steps.

Chip manufacturers also face the problem of improving the uniformity of PUFs when used as pseudo-random number generators. In some cases, this problem may include a cross-correlation between dice because of the phenomena on which a seed value provided by the PUF is based.

A PUF is based on unpredictable physical phenomena such as, for example, on-chip parasitic effect, on-chip path delays, etc., which are unique for each die. These phenomena are used, for example, to provide a seed value for a pseudo-random number generator.

Two different chips selected in the production line must have different PUF values. The PUF value generated in each chip must not change during the life of the device. If two chips have similar keys (e.g., there is a low Hamming distance between them), it may be possible to use a key of one chip to guess the key of another chip (e.g., preimage hacker attack).

Using the improved PUF architecture described below can provide a solution to one or more of the above problems by providing output values suitable for providing the function of a PUF on each chip or die. The improved PUF architecture below uses a PUF, which enables each chip or die to automatically generate a unique secure key at each power-up of the chip or die. The secure key does not need to be stored in a non-volatile memory, which might be hacked or otherwise compromised.

The improved PUF architecture further uses a MAC to generate the improved PUF output (e.g., a unique key) for use by, for example, cryptographic functions or processes that are integrated into the semiconductor chip. The use of the MAC can, for example, increase the Hamming distance between keys generated on different chips.

In at least some embodiments disclosed herein, an improved PUF architecture using the output from a MAC is provided as a way to generate seed or other values. Thus, the improved PUF architecture provides, for example, a way to perform key injection that reduces cost of manufacture, and that improves reliability and/or uniformity of PUF operation on the final chip.

In one embodiment, a method includes: providing, by at least one PUF, at least one value; and generating, based on a MAC, a first output, wherein the MAC uses the at least one value provided by the at least one PUF as an input for generating the first output.

In one embodiment, a system includes: at least one PUF device; a message authentication code MAC module configured to receive a first input based on at least one value provided by the at least one PUF device; at least one processor; and memory containing instructions configured to instruct the at least one processor to generate, based on the first input, a first output from the MAC module. In various embodiments, the MAC module can be implemented using hardware and/or software.

In one embodiment, the system further includes a selector module that is used to select one or more of the PUF devices for use in providing values to the MAC module. For example, values provided from several PUF devices can be linked and provided as an input to the MAC module. In various embodiments, the selector module can be implemented using hardware and/or software.

FIG. 1 shows a system that provides a PUF architecture 111 used to generate a unique key 125 (or other value) from an output of a message authentication code (MAC) module 123, according to one embodiment. The MAC module 123 receives an input value obtained from a physical unclonable function (PUF) device 121.

The PUF device 121 in FIG. 1 can be, for example, any one of various different, known types of PUFs. The MAC module 123 provides, for example, a one-way function such as SHA1, SHA2, MD5, CRC, TIGER, etc.

The architecture 111 can, for example, improve the Hamming distance of the PUF values or codes generated between chips. The MAC functions are unpredictable (e.g., input sequences with just a single bit difference provided to the MAC function provide two completely different output results). Thus, the input to MAC function cannot be recognized or determined when having only knowledge of the output. The architecture 111 also can, for example, improve the uniformity of the PUF as a pseudo-random number generator.

In one example, the value generated by the PUF architecture 111 (e.g., unique key 125 or another value) may be a number having N bits, where N depends on a cryptographic algorithm implemented on a chip (e.g., memory device 103 or another device) that includes the PUF architecture 111. In one example, the chip implements a cryptographic function that uses HMAC-SHA256, in which case the output from MAC module 123 has a size N of 256 bits. The use of the output from the MAC module 123 provides a message length for the output value that is suitable for use as a key (without needing further compression or padding).

The PUF architecture 111 is implemented in a device such as the illustrated memory device 103, or can be implemented in other types of computing devices such as, for example, integrated circuits implemented in a number of semiconductor chips provided by a wafer manufacturing production line.

In one embodiment, the MAC module 123 cooperates with and/or is integrated into or as part of cryptographic module 127, for example which can provide cryptographic functions for memory device 103. For example, the output of the MAC module 123 can be suitable to be used as a key due to the MAC being used by the memory device 103 for other cryptographic purposes.

The operation of the PUF architecture 111, the cryptographic module 127, and/or other functions of the memory device 103 can be controlled by a controller 107. The controller 107 can include, for example, one or more microprocessors.

In FIG. 1, a host 101 can communicate with the memory device 103 via a communication channel. The host 101 can be a computer having one or more Central Processing Units (CPUs) to which computer peripheral devices, such as the memory device 103, may be attached via an interconnect, such as a computer bus (e.g., Peripheral Component Interconnect (PCI), PCI eXtended (PCI-X), PCI Express (PCIe)), a communication portion, and/or a computer network.

The memory device 103 can be used to store data for the host 101, for example, in the non-volatile storage media 109. Examples of memory devices in general include hard disk drives (HDDs), solid state drives (SSDs), flash memory, dynamic random-access memory, magnetic tapes, network attached storage device, etc. The memory device 103 has a host interface 105 that implements communications with the host 101 using the communication channel. For example, the communication channel between the host 101 and the memory device 103 is a Peripheral Component Interconnect Express (PCI Express or PCIe) bus in one embodiment; and the host 101 and the memory device 103 communicate with each other using NVMe protocol (Non-Volatile Memory Host Controller Interface Specification (NVMHCI), also known as NVM Express (NVMe)).

In some implementations, the communication channel between the host 101 and the memory device 103 includes a computer network, such as a local area network, a wireless local area network, a wireless personal area network, a cellular communications network, a broadband high-speed always-connected wireless communication connection (e.g., a current or future generation of mobile network link); and the host 101 and the memory device 103 can be configured to communicate with each other using data storage management and usage commands similar to those in NVMe protocol.

The controller 107 can run firmware 104 to perform operations responsive to the communications from the host 101, and/or other operations. Firmware in general is a type of computer program that provides control, monitoring and data manipulation of engineered computing devices. In FIG. 1, the firmware 104 controls the operations of the controller 107 in operating the memory device 103, such as the operation of the PUF architecture 111, as further discussed below.

The memory device 103 has non-volatile storage media 109, such as magnetic material coated on rigid disks, and/or memory cells in an integrated circuit. The storage media 109 is non-volatile in that no power is required to maintain the data/information stored in the non-volatile storage media 109, which data/information can be retrieved after the non-volatile storage media 109 is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media 109 is non-volatile and can retain data stored therein without power for days, months, and/or years.

The memory device 103 includes volatile Dynamic Random-Access Memory (DRAM) 106 for the storage of run-time data and instructions used by the controller 107 to improve the computation performance of the controller 107 and/or provide buffers for data transferred between the host 101 and the non-volatile storage media 109. DRAM 106 is volatile in that it requires power to maintain the data/information stored therein, which data/information is lost immediately or rapidly when the power is interrupted.

Volatile DRAM 106 typically has less latency than non-volatile storage media 109, but loses its data quickly when power is removed. Thus, it is advantageous to use the volatile DRAM 106 to temporarily store instructions and data used for the controller 107 in its current computing task to improve performance. In some instances, the volatile DRAM 106 is replaced with volatile Static Random-Access Memory (SRAM) that uses less power than DRAM in some applications. When the non-volatile storage media 109 has data access performance (e.g., in latency, read/write speed) comparable to volatile DRAM 106, the volatile DRAM 106 can be eliminated; and the controller 107 can perform computing by operating on the non-volatile storage media 109 for instructions and data instead of operating on the volatile DRAM 106.

For example, cross point storage and memory devices (e.g., 3D XPoint memory) have data access performance comparable to volatile DRAM 106. A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller 107 has in-processor cache memory with data access performance that is better than the volatile DRAM 106 and/or the non-volatile storage media 109. Thus, it is preferred to cache parts of instructions and data used in the current computing task in the in-processor cache memory of the controller 107 during the computing operations of the controller 107. In some instances, the controller 107 has multiple processors, each having its own in-processor cache memory.

Optionally, the controller 107 performs data intensive, in-memory processing using data and/or instructions organized in the memory device 103. For example, in response to a request from the host 101, the controller 107 performs a real-time analysis of a set of data stored in the memory device 103 and communicates a reduced data set to the host 101 as a response. For example, in some applications, the memory device 103 is connected to real-time sensors to store sensor inputs; and the processors of the controller 107 are configured to perform machine learning and/or pattern recognition based on the sensor inputs to support an artificial intelligence (AI) system that is implemented at least in part via the memory device 103 and/or the host 101.

In some implementations, the processors of the controller 107 are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The memory device 103 can be used in various computing systems, such as a cloud computing system, an edge computing system, a fog computing system, and/or a standalone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments disclosed herein can be implemented using computer instructions executed by the controller 107, such as the firmware 104. In some instances, hardware circuits can be used to implement at least some of the functions of the firmware 104. The firmware 104 can be initially stored in the non-volatile storage media 109, or another non-volatile device, and loaded into the volatile DRAM 106 and/or the in-processor cache memory for execution by the controller 107.

For example, the firmware 104 can be configured to use the techniques discussed below in operating the PUF architecture. However, the techniques discussed below are not limited to being used in the computer system of FIG. 1 and/or the examples discussed above.

In some implementations, the output of the MAC module 123 can be used to provide, for example, a root key or a seed value. In other implementations, the output can be used to generate one or more session keys.

In one embodiment, the output from the MAC module 123 can be transmitted to another computing device. For example, the unique key 125 can be transmitted via host interface 105 to host 101.

Figure 2:
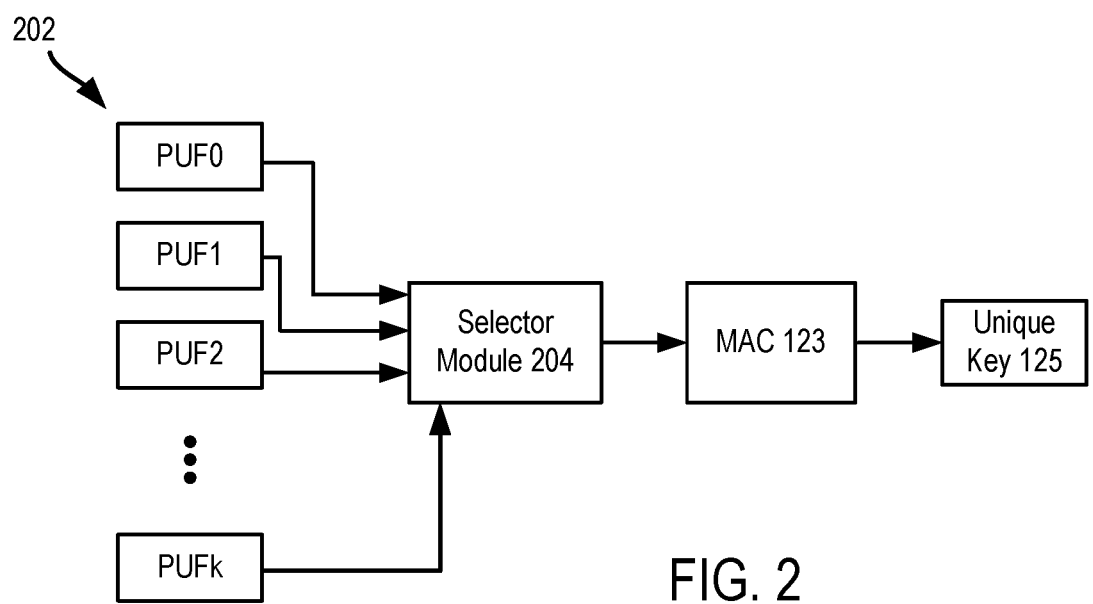
FIG. 2 shows a system for generating a unique key from an output of a MAC that receives inputs from one or more PUF devices selected by a selector module, according to one embodiment.

FIG. 2 shows a system for generating the unique key 125 from an output of the MAC module 123 using a PUF architecture similar to architecture 111 of FIG. 1, but including multiple PUF devices 202 and a selector module 204, according to one embodiment. The MAC module 123 receives inputs from one or more PUF devices 202 selected by the selector module 204. In one example, PUF devices 202 include PUF device 121.

The PUF devices 202 can be, for example, identical or different (e.g., based on different random physical phenomena). In one embodiment, selector module 204 acts as an intelligent PUF selection block or circuit to select one or more of PUF devices 202 from which to obtain values to provide as inputs to the MAC module 123.

In one embodiment, the selector module 204 bases the selection of the PUF devices 202 at least in part on results from testing the PUF devices 202. For example, the selector module 204 can test the repeatability of each PUF device 202. If any PUF device 202 fails testing, then the selector module 204 excludes the failing device from providing an input value to the MAC module 123. In one example, the failing device can be excluded temporarily or indefinitely.

In some implementations, the selector module 204 permits testing the PUF functionality of each chip during production and/or during use in the field (e.g., by checking the repeatability of the value provided by each PUF device 202). If two or more values provided by a given PUF device are different, then the PUF device is determined to be failing and is excluded from use as an input to the MAC module 123.

In one embodiment, the selector module 204 is used to concurrently use multiple PUF devices 202 as sources for calculating an improved PUF output from the MAC module 123. For example, the selector module 204 can link a value from a first PUF device with a value from a second PUF device to provide as an input to the MAC module 123. In some implementations, this architecture permits obtaining a robust PUF output due to its dependence on several different physical phenomena.

Figure 3:
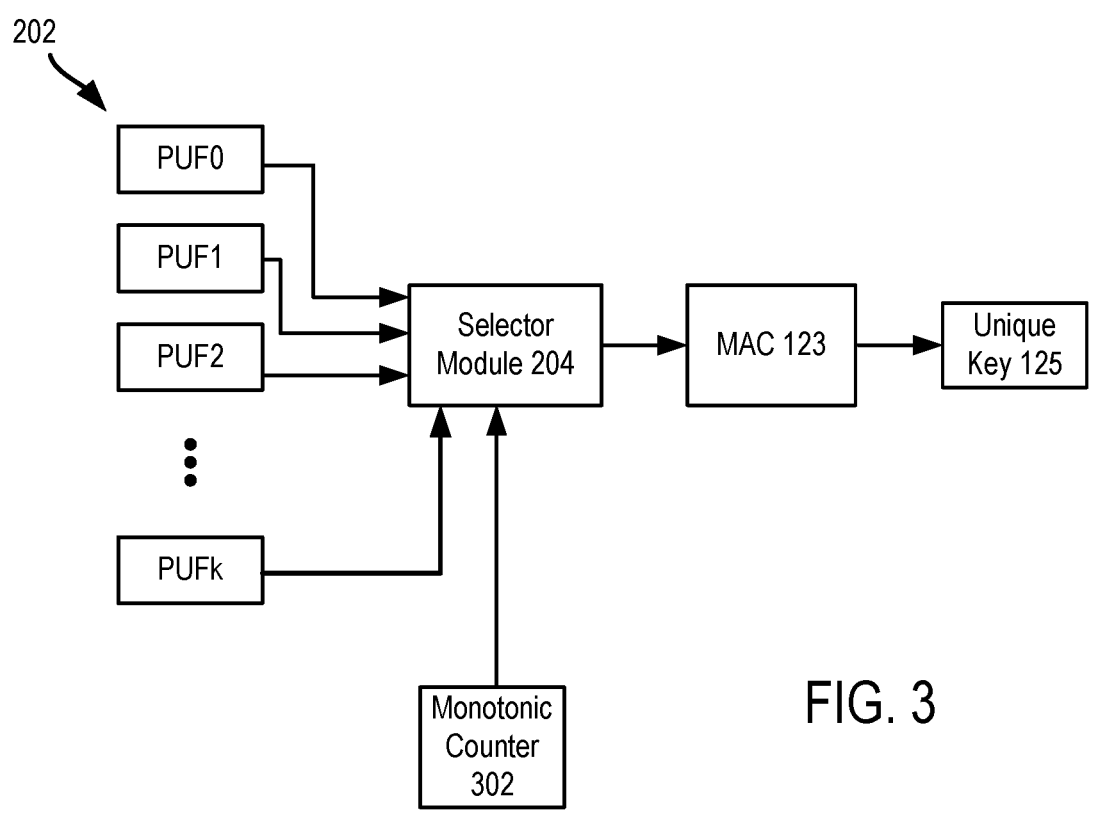
FIG. 3 shows a system for generating a unique key from an output of a MAC that receives inputs from one or more PUF devices and an input from a monotonic counter (and/or an input from another freshness mechanism like NONCE, time-stamp, etc.), according to one embodiment.

FIG. 3 shows a system for generating the unique key 125 from an output of the MAC module 123, according to one embodiment. The PUF architecture illustrated in FIG. 3 is similar to the PUF architecture illustrated in FIG. 2, except that a monotonic counter 302 is included to provide values to selector module 204. In various embodiments, the monotonic counter 302 can be implemented using hardware and/or software.

The MAC module 123 receives inputs from one or more PUF devices 202 and an input from the monotonic counter 302. In one example, values obtained from the PUF devices 202 and the monotonic counter 302 are linked and then provided as an input to the MAC module 123. In some implementations, the monotonic counter 302 is a non-volatile counter that only increments its value when requested. In some embodiments, the monotonic counter 302 is incremented after each power-up cycle of a chip.

In some implementations, the PUF architecture of FIG. 3 can be used to provide a way to securely share keys between a semiconductor chip and other components in an application, such as for example a public key mechanism.

In some implementations, the monotonic counter 302 is incremented before each calculation of a PUF, which ensures that the input of the MAC module 123 is different at each cycle, and thus the output (and/or pattern of output) provided is different. In some examples, this approach can be used to generate a session key, where each session key is different.

In some embodiments, the selector module 204 can selectively include or exclude the monotonic counter 302 (or other freshness mechanism like NONCE, timestamp) from providing a counter value as an input to the MAC module 123.

In some embodiments, the monotonic counter 302 is also used by cryptographic module 127. In some embodiments, a PUF architecture that includes the monotonic counter can be used as a session key generator to guarantee a different key at each cycle. In some implementations, the generated session key is protected in this way: Session key=MAC [one or more PUFs|MTC or other freshness]

In other embodiments, a mechanism is used as follows:
Session key=$\text{MAC}_{key\_based}$ [Root_Key, MTC or other freshness mechanism]
Where: Root_Key=an output value provided from the MAC module 123 above, or any other kind of key that is present on the chip.
The $\text{MAC}_{key\_based}$ function above is, for example, a MAC algorithm based on a secret key. For example, there can be two types of MAC algorithm in cryptography:

1. An algorithm based on a secret key like, for example, HMAC family (HMAC-SHA256 is key based).
2. An algorithm that is not based on a secret key, for example like SHA256 (SHA stand-alone is not key based).

It should be noted that a MAC that is key-based can be transformed in a MAC that is not key-based by setting the key to a known value (e.g. 0x000 . . . 0xFFFF etc. . . . ).

Figure 5:
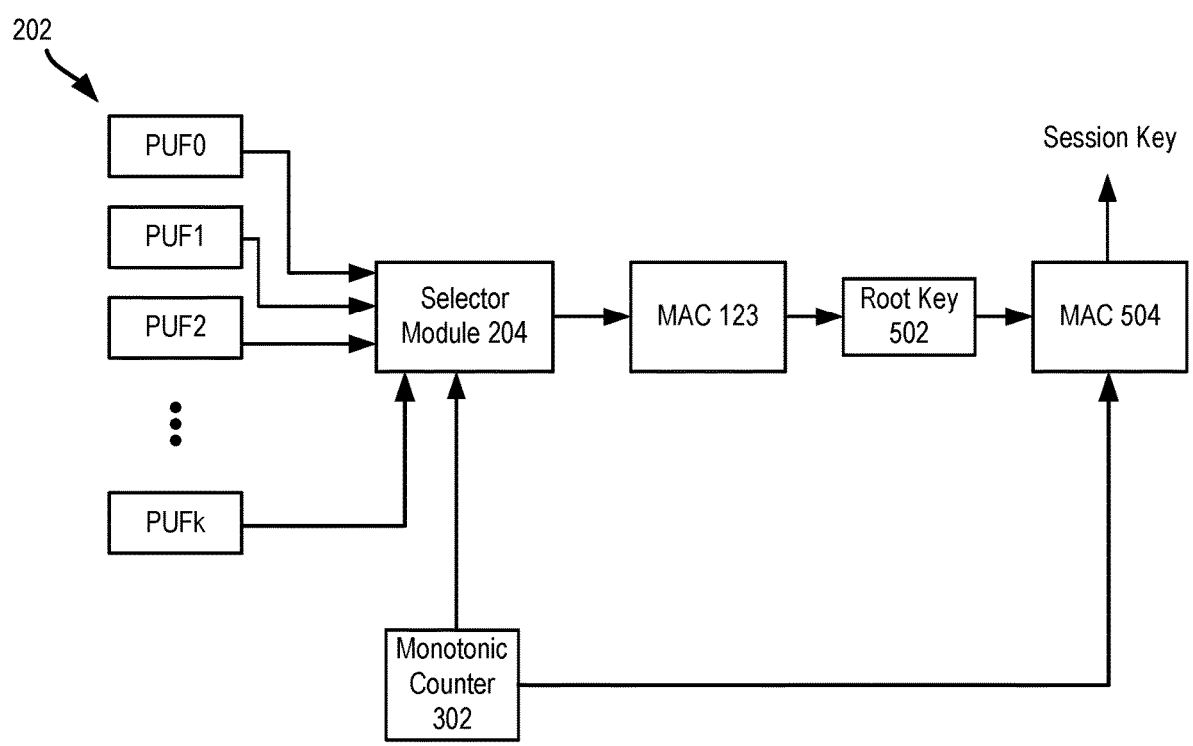
FIG. 5 shows a system for generating a root key from an output of a MAC that receives inputs from one or more PUF devices and an input from a monotonic counter (and/or an input from another freshness mechanism like NONCE, time-stamp, etc.), and that adds an additional MAC to generate a session key, according to one embodiment.

FIG. 5 shows a system for generating a root key from an output of a MAC that receives inputs from one or more PUF devices 202 and an input from a monotonic counter 302 (and/or an input from another freshness mechanism like NONCE, time-stamp, etc.), and that adds an additional MAC module 504 to generate a session key using a root key input, according to one embodiment. In this embodiment, MAC module 123 provides root key 502 as the output from MAC module 123. Root key 502 is an input to the MAC module 504, which can use a MAC function such as Session key=$\text{MAC}_{key\_based}$ [Root_Key, MTC or other freshness mechanism], which was described above. The root key input in this key-based function can be root key 502, as illustrated.

Additionally, in one embodiment, monotonic counter 302 can provide an input to the MAC module 504. In other embodiments, a different monotonic counter or other value from the chip can be provided as an input to MAC module 504 instead of using monotonic counter 302. In some cases, the monotonic counter 302 provides a counter value to MAC module 504, but not to selector module 204. In other cases, the counter value can be provided to both MAC modules, or excluded from both modules.

Figure 4:
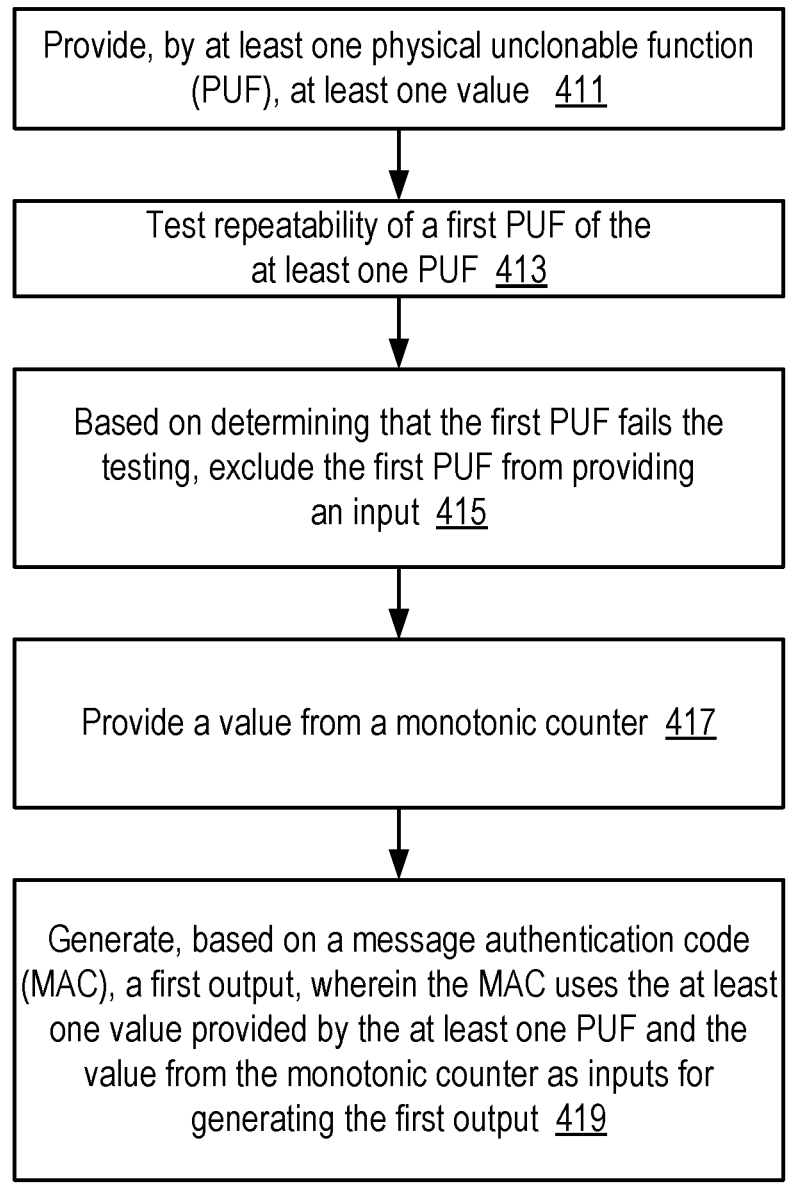
FIG. 4 shows a method to generate an output from a MAC that uses one or more input values provided from one or more PUFs, according to one embodiment.

FIG. 4 shows a method to generate an output from a MAC that uses one or more input values provided from one or more PUFs, according to one embodiment. For example, the method of FIG. 4 can be implemented in the memory device 103 of FIG. 1.

The method of FIG. 4 includes, at block 411, providing one or more values by at least one PUF (e.g., providing values from one or more of PUF devices 202).

At block 413, repeatability of one or more of the PUFs can be tested, for example as was described above. This testing is optional.

At block 415, if testing has been performed at block 413, and it has been determined that a PUF device fails the testing, then the failing PUF device is excluded from providing an input to the MAC. This excluding may be performed, for example, by selector module 204, as was discussed above.

At block 417, a value is provided from a monotonic counter (e.g., monotonic counter 302). The use of the monotonic counter in the PUF architecture is optional.

At block 419, an output is generated from the MAC, which uses one or more values provided by the PUFs (and optionally at least one value from the monotonic counter) as inputs to the MAC.

Various other embodiments are now described below for a method implemented in a computing device that includes: providing, by at least one physical unclonable function (PUF), at least one value; and generating, based on a message authentication code (MAC), a first output, wherein the MAC uses the at least one value provided by the at least one PUF as an input for generating the first output.

In one embodiment, the computing device is a first computing device, and the method further comprises transmitting the first output to a second computing device, wherein the first output is a unique identifier of the first computing device.

In one embodiment, providing the at least one value comprises selecting a first value from a first PUF and selecting a second value from a second PUF.

In one embodiment, the method further comprises: providing a value from a monotonic counter; wherein generating the first output further comprises using the value from the monotonic counter as an additional input to the MAC for generating the first output.

In one embodiment, the method further comprises: generating a plurality of session keys based on respective outputs provided by the MAC, wherein the monotonic counter provides values used as inputs to the MAC; and incrementing the monotonic counter after generating each of the session keys.

In one embodiment, the method further comprises: testing repeatability of a first PUF of the at least one PUF; and based on determining that the first PUF fails the testing, excluding the first PUF from providing any input to the MAC when generating the first output.

In one embodiment, the testing comprises comparing two or more values provided by the first PUF.

In one embodiment, the computing device is a memory device, and the memory device comprises a non-volatile storage media configured to store an output value generated using the MAC.

In one embodiment, the method further comprises performing, by at least one processor, at least one cryptographic function, wherein performing the at least one cryptographic function comprises using an output value generated using the MAC.

In one embodiment, a non-transitory computer storage medium stores instructions which, when executed on a memory device (e.g., the memory device 103), cause the memory device to perform a method, the method comprising: providing, by at least one physical unclonable function (PUF), at least one value; and generating, based on a message authentication code (MAC), a first output, wherein the MAC uses the at least one value provided by the at least one PUF as an input for generating the first output.

In various other embodiments described below, the method of FIG. 4 can be performed on a system that includes: at least one physical unclonable function (PUF) device; a message authentication code (MAC) module configured to receive a first input based on at least one value provided by the at least one PUF device; at least one processor; and memory containing instructions configured to instruct the at least one processor to generate, based on the first input, a first output from the MAC module.

In one embodiment, the MAC module includes a circuit. In one embodiment, the first output from the MAC module is a key that identifies a die. In one embodiment, the first output from the MAC module is a root key, and the instructions are further configured to instruct the at least one processor to generate a session key using an output from the MAC module.

In one embodiment, the system is part of a semiconductor chip (e.g., one chip of several chips obtained from a semiconductor wafer), the first output from the MAC module is a unique value that identifies the chip, and the instructions are further configured to instruct the at least one processor to transmit the unique value to a computing device.

In one embodiment, the at least one PUF device comprises a plurality of PUF devices (e.g., PUF devices 202), and the system further comprises a selector module configured to select the at least one PUF device that provides the at least one value.

In one embodiment, the selector module is further configured to generate the first input for the MAC module by linking a first value from a first PUF device and a second value from a second PUF device.

In one embodiment, the system further comprises a monotonic counter configured to provide a counter value, and the instructions are further configured to instruct the at least one processor to generate the first input by linking the counter value with the at least one value provided by the at least one PUF device.

In one embodiment, the system further comprises a selector module configured to select the at least one PUF device that provides the at least one value, wherein linking the counter value with the at least one value provided by the at least one PUF device is performed by the selector module.

In one embodiment, the monotonic counter is further configured to increment, after generating the first input, the counter value to provide an incremented value; and the instructions are further configured to instruct the at least one processor to generate, based on the incremented value and at least one new value provided by the at least one PUF device, a second output from the MAC module.

Key Generation and Secure Storage

As mentioned above, PUFs can be used for secure key generation. Various embodiments discussed below relate to generating an initial key using at least one PUF, applying processing to increase obfuscation of the initial key, and storing the final obfuscated key in a non-volatile memory. The final obfuscated key and/or an intermediate key used to generate the final obfuscated key can be shared with another computing device and used for secure communication with the other computing device (e.g., messaging using symmetric cryptography based on a shared key). In some embodiments, the secure key generation is done for computing devices to be used in automotive applications (e.g., a controller in an autonomous vehicle).

In alternative embodiments, the initial key is generated in other ways that do not require using the at least one PUF above. In one embodiment, the initial key can be generated by using an injected key. For example, the initial key is present in a chip due to being injected in a factory or other secure environment. In this case, the applying processing to increase obfuscation of the initial key is performed by applying obfuscation processing to the injected key.

The automotive environment presents the technical problem of introducing "noise" during the key generation phase. Various embodiments below provide a technological solution to this problem by using a methodology to diminish or avoid key variation due to this induced noise by storing an obfuscated key inside a non-volatile memory area.

The automotive environment can affect key generation in various ways. For example, engine power-on can cause a drop in application power to a computing device resulting in a key being generated in the wrong manner. Temperature extremes can also affect the circuit that generates the key. Other sources such as magnetic fields from power lines can cause inter-symbol interference or crosstalk, making a host not recognize the device.

In contrast, if the key is generated in a safe environment and is stored in memory, it will be immune from noise. A safe environment can be, for example, directly mounted in a car, in a test environment, or in a factory (e.g., that manufactures the computing device generating the key) depending on the strategy used to propagate the key between end users/customers of the computing device product.

In one example, ADAS or other computing systems as used in vehicles are subject to power supply variations. This can occur, for example, during turning on the vehicle, braking, powering the engine, etc.

Various embodiments to generate and store a key as discussed below provide the advantages of being substantially independent from external factors (e.g., power supply variations, temperature and other external sources of noise). Another advantage in some embodiments is that for every cycle, for example, the generation of the key vector is the same.

When storing the key, another advantage provided in some embodiments is that the key is substantially immune against hardware attack (e.g., that hackers might put in place). For example, one such attack is monitoring of the power-on current of a device so as to associate current variation to bits associated with the key. Other attacks can use, for example, voltage measurements (e.g., a Vdd supply voltage). Some attacks can use, for example, temperature variations to interfere with operation of a device.

In some embodiments, the initial key can be generated using the approaches and/or architectures as described above for FIGS. 1-5. For example, a PUF is used to generate the key for every power-on cycle of the computing device that is storing the key. In alternative embodiments, other approaches can be used to generate the initial key.

In one exemplary approach, as discussed earlier above, key injection uses at least one PUF and a MAC algorithm (e.g., SHA256) to generate a key for a device that is significantly different from other devices (e.g., from adjacent die located on a wafer). The MAC cryptography algorithm provides the benefit of increasing the entropy of the bits generated by the PUF.

In one embodiment, the generated key (e.g., the initial key as provided from a PUF and then a MAC algorithm) is stored in a non-volatile area of the device after pre-processing is performed on the key in order to diminish or avoid hacker attacks, and also to improve reliability of the stored key. In one embodiment, after the key is stored, the circuit generating the key can be disabled. The pre-processing is generally referred to herein as obfuscation processing. In one example, circuitry and/or other logic is used to implement the obfuscation processing on the device. In one example, the stored key can be read by the device because the key is independent from the external source of noise. An internal mechanism is used to read any data of the device.

In various embodiments, storing the key as described herein increases the margin against noise. Also, this makes it difficult for a hacker to read the stored key, for example, using a power monitoring or other hacking method.

At least some embodiments herein use a PUF and an encryption algorithm (e.g., HMAC-SHA256) to make the key generation independent from external factors such as temperature or voltage that may otherwise cause the key to be different from one power-on of the device to the next power-on. If this occurs, it can be a problem for a host to be able to exchange messages with the device. Various embodiments make the key generation more robust by placing the stored key in memory such that it is not impacted by external factors.

In one embodiment, the key is generated once on a device (e.g., on an SRAM reset) and stored in non-volatile memory of the device. The key can also be re-generated at other times through a command sequence, as may be desired. In one embodiment, this key generation is independent of the cryptography implemented by the device. The generated key is shared with a host. This embodiment stores the key and/or reads the key in the device in a way that avoids an attacker guessing the key and using it internally, such as for example by analyzing the shape of the current that the device absorbs during key usage.

In addition, for example, in asymmetric cryptography the generated key becomes the variable password that is the secret key of the system. The key is not shared with others. For public key cryptography, the key is used to generate a corresponding public key.

In various embodiments, an initial key is generated using an injected key or using one or more PUFs (e.g., to provide a initial key PUF0). The initial key is then subjected to one or more steps of obfuscation processing to provide intermediate keys (e.g., PUF1, PUF2, PUF5) such as described below. The output (e.g., PUF5) from this processing is an obfuscated key that is stored in non-volatile memory of the device. When using an injected key, obfuscation processing is applied to the injected key similarly as described below for the non-limiting example of PUF0.

In one embodiment, as mentioned above, a mechanism is used as follows for the case of an initial injected key:

Session key=$\text{MAC}_{key\_based}$ [Root_Key, MTC or other freshness mechanism]

Where: Root_Key=any other kind of key that is present on the chip (e.g., the key can be an initial key injected in the chip in a factory or other secure environment)

In one embodiment, on first power-up of a device, a special sequence wakes up at least one circuit (e.g., a read circuit) of the device and verifies that the circuit(s) is executing properly. The device then generates an initial key PUF0, as mentioned above. This key can be stored or further processed to make it more robust for secure storage, as described below.

An intermediate key, PUF1, is generated by concatenating PUF0 with a predetermined bit sequence (e.g., a sequence known by others) to generate PUF1. In one embodiment, PUF1 is used to verify the ability of the device to correctly read the key and to ensure that noise, such as fluctuations in the power supply, are not affecting the generated key.

A next intermediate key, PUF2, is generated. PUF1 is interleaved with an inverted bit pattern (e.g., formed by inverting the bits of PUF1, and sometimes referred to herein as PUF1 bar) to generate PUF2.

In one embodiment, PUF2 has the same bit number of 0s and 1s. This makes the shape of the device current substantially the same for any key (e.g., any key stored on the device). This reduces the possibility of an attacker guessing the key value by looking at the shape of the device current when the key is being read by the device.

A next intermediate key, PUF3, is generated. The bits of PUF2 are interleaved with pseudo-random bits to form PUF3. This further helps to obfuscate the key. In one embodiment, the pseudo-random bits are derived from PUF1 or PUF2 by using a hash function. For example, these derived bits are added to PUF2 to form PUF3.

A next intermediate key, PUF4, is generated. Error Correction Codes (ECCs) are generated by the internal circuitry of the device (e.g., during programming). The bits of the ECC are added to PUF3 to generate PUF4. In one embodiment, the ECC bits help guard against the effects of non-volatile memory (e.g., NVRAM) aging that can be caused by, for example, device endurance limits, X-rays and particles. Non-volatile memory aging can also be caused, for example, by an increase in the number of electrons in the NV cell which can cause bits to flip.

A next intermediate key, PUF5, is generated. PUF5 is a concatenation of several copies of PUF4. Having the redundancy of multiple PUF4 copies present in PUF5 further increases robustness by increasing the likelihood of being able to correctly read the key at a later time. In one embodiment, several copies of PUF5 are stored in various regions of non-volatile memory storage to further increase robustness. For example, even if PUF5 is corrupted in one of the regions, PUF5 can be read from other of the regions, and thus the correct key can be extracted.

In one embodiment, PUF1 or PUF3 is the key that is shared with a host for symmetric cryptography, or used to generate a public key for asymmetric cryptography. In one embodiment, PUF4 and PUF5 are not shared with end users or a host.

The above approach is modular in that PUF2, PUF3, PUF4 and/or PUF5 are not required for generating an obfuscated key. Instead, in various embodiments, one or more of the foregoing obfuscation steps can be applied to the initial key, and further the ordering can be varied. For example, the number obfuscation steps can be decreased for a system that is known not to have Vdd voltage supply drops.

In one embodiment, when storing the obfuscated key, the bit patterns will be physically spread around the non-volatile storage media (e.g., in different rows and words). For example, the device is able to read the bits at the same time and protect against multi-bit errors.

Figure 6:
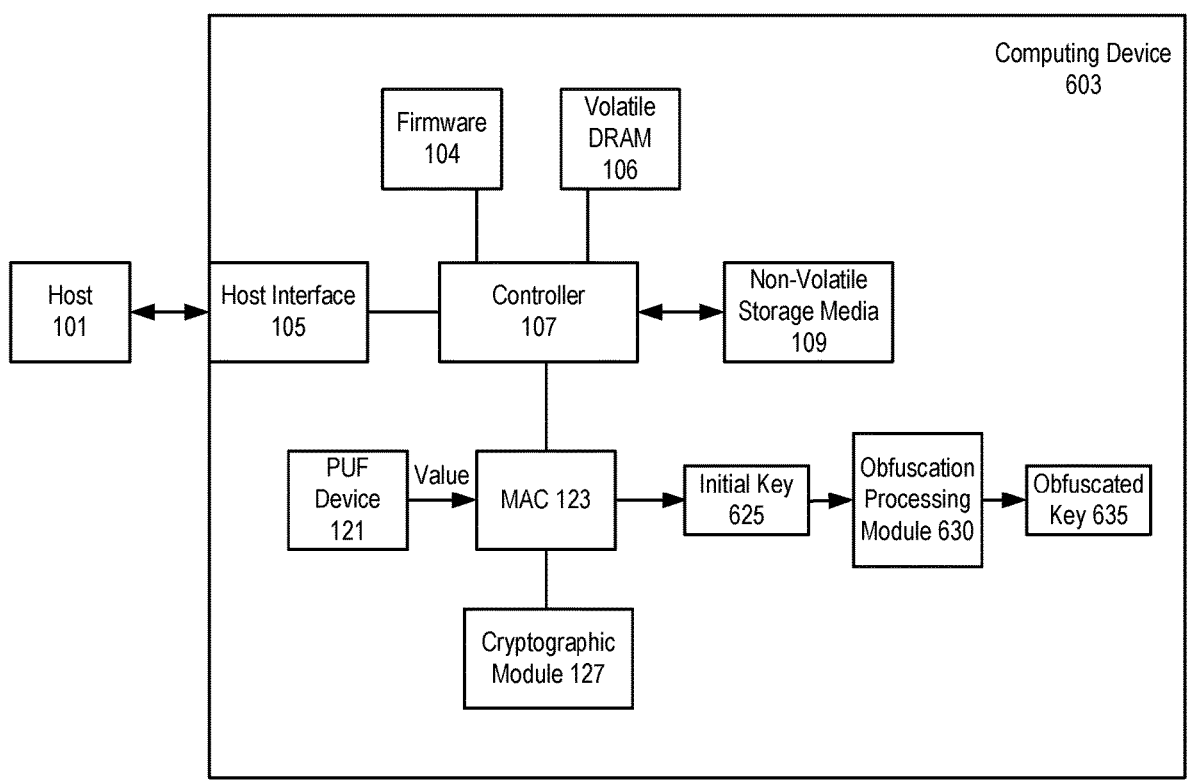
FIG. 6 shows a computing device for storing an obfuscated key in non-volatile memory, according to one embodiment.

FIG. 6 shows a computing device 603 for storing an obfuscated key 635 in non-volatile memory (e.g., non-volatile storage media 109), according to one embodiment. An initial key 625 is generated based on a value provided by at least one physical unclonable function device 121. The obfuscated key 635 is generated based on initial key 625. After being generated, the obfuscated key 635 is stored in non-volatile storage media 109.

In one embodiment, a message authentication code (MAC) 123 uses the value from PUF device 121 as an input and provides the initial key 625 as an output. In one embodiment, obfuscation processing module 630 is used to perform processing on initial key 625 in order to provide obfuscated key 635 (e.g., PUF5), for example as was discussed above.

In one embodiment, the obfuscated key 635 is securely distributed to another computing device as described in related U.S. Non-Provisional application Ser. No. 15/965, 731, filed 27 Apr. 2018, entitled "SECURE DISTRIBUTION OF SECRET KEY USING A MONOTONIC COUNTER," by Mondello et al., the entire contents of which application is incorporated by reference as if fully set forth herein. In other embodiments, initial key 625 and/or any one or more of the intermediate keys from the obfuscation processing described herein can be securely distributed in the same or a similar manner. Optionally, an end user/customer uses the foregoing approach to read the value of an initial key (e.g., PUF0), an intermediate key, and/or a final obfuscated key (e.g., PUF5). For example, the end user can verify the proper execution of the internal generation of the key by the device, and/or monitor the statistical quality of the key generation.

Figure 7:
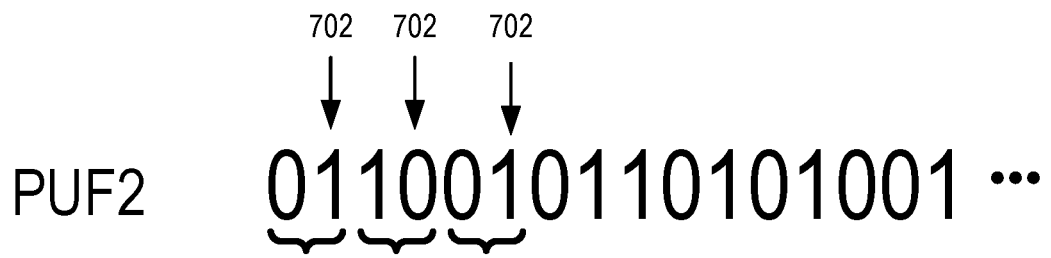
FIG. 7 shows an example of an intermediate key generated during an obfuscation process, according to one embodiment.

FIG. 7 shows an example of an intermediate key (PUF2) generated during an obfuscation process by obfuscation processing module 630, according to one embodiment. As mentioned above, the bits of PUF1 are inverted to provide inverted bits 702. Bits 702 are interleaved with the bits of PUF1 as illustrated. For example, every second bit in the illustrated key is an interleaved inverted bit 702.

Figure 8:
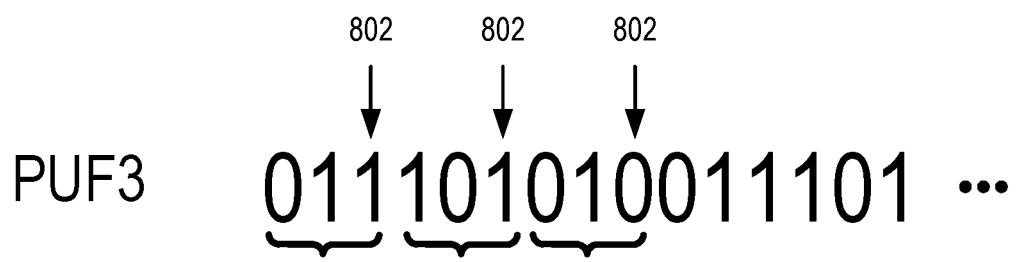
FIG. 8 shows an example of another intermediate key generated during the obfuscation process of FIG. 7, according to one embodiment.

FIG. 8 shows an example of another intermediate key (PUF3) generated during the obfuscation process of FIG. 7 (PUF3 is based on PUF2 in this example), according to one embodiment. As mentioned above, the bits of PUF2 are further interleaved with pseudo-random bits 802. As illustrated, bits 802 are interleaved with PUF2. For example, every third bit in the illustrated key is an interleaved pseudo-random bit 802.

Figure 9:
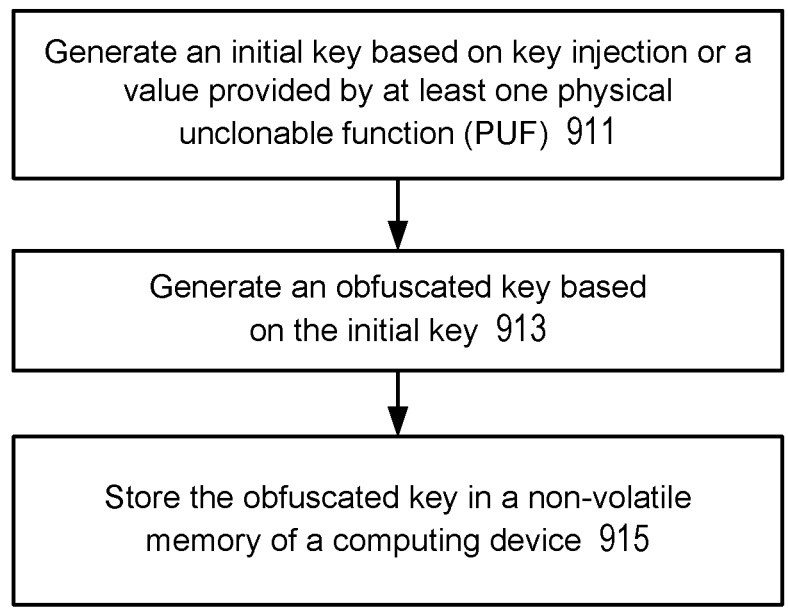
FIG. 9 shows a method for generating and storing an obfuscated key in a non-volatile memory, according to one embodiment.

FIG. 9 shows a method for generating and storing an obfuscated key (e.g., obfuscated key 635) in a non-volatile memory (e.g., non-volatile storage media 109), according to one embodiment. In block 911, an initial key is generated based on a value provided by at least one physical unclonable function (PUF).

In other embodiments, in block 911, the initial key is generated by key injection. For example, the initial key can simply be a value injected into a chip during manufacture.

In block 913, an obfuscated key is generated based on the initial key. For example, the generated obfuscated key is PUF3 or PUF5.

In block 915, the obfuscated key is stored in a non-volatile memory of a computing device. For example, the obfuscated key is stored in NAND flash memory or an EEPROM.

In one embodiment, a method includes: generating an initial key using key injection; generating an obfuscated key based on the initial key; and storing the obfuscated key in non-volatile memory. For example, the initial key can be the key injected during a key injection process at the time of manufacture.

In one embodiment, a method comprises: generating an initial key provided by key injection or based on a value provided by at least one physical unclonable function (PUF); generating an obfuscated key based on the initial key; and storing the obfuscated key in a non-volatile memory of the computing device.

In one embodiment, generating the initial key comprises using the value from the PUF (or, for example, another value on the chip) as an input to a message authentication code (MAC) to generate the initial key.

In one embodiment, the obfuscated key is stored in the non-volatile memory outside of user-addressable memory space.

In one embodiment, generating the obfuscated key comprises concatenating the initial key with a predetermined pattern of bits.

In one embodiment, concatenating the initial key with the predetermined pattern of bits provides a first key (e.g., PUF1); and generating the obfuscated key further comprises interleaving the first key with an inverted bit pattern, wherein the inverted bit pattern is provided by inverting bits of the first key.

In one embodiment, interleaving the first key with the inverted bit pattern provides a second key (e.g., PUF2); and generating the obfuscated key further comprises interleaving the second key with pseudo-random bits.

In one embodiment, the method further comprises deriving the pseudo-random bits from the first key or the second key using a hash function.

In one embodiment, interleaving the second key with pseudo-random bits provides a third key (e.g., PUF3); and generating the obfuscated key further comprises concatenating the third key with error correction code bits.

In one embodiment, the computing device is a first computing device, the method further comprising sharing at least one of the initial key, the first key, or the third key with a second computing device, and receiving messages from the second computing device encrypted using the shared at least one of the initial key, the first key, or the third key.

In one embodiment, concatenating the third key with error correction code bits provides a fourth key (e.g., PUF4); and generating the obfuscated key further comprises concatenating the fourth key with one or more copies of the fourth key.

In one embodiment, concatenating the fourth key with one or more copies of the fourth key provides a fifth key (e.g., PUF5); and storing the obfuscated key comprises storing a first copy of the fifth key on at least one of a different row or block of the non-volatile memory than a row or block on which a second copy of the fifth key is stored.

In one embodiment, a system comprises: at least one physical unclonable function (PUF) device (e.g., PUF device 121) configured to provide a first value; a non-volatile memory (e.g., non-volatile storage media 109) configured to store an obfuscated key (e.g., key 635); at least one processor; and memory containing instructions configured to instruct the at least one processor to: generate an initial key based on the first value provided by the at least one PUF device; generate the obfuscated key based on the initial key; and store the obfuscated key in the non-volatile memory.

In one embodiment, the system further comprises a message authentication code (MAC) module (e.g., MAC 123) configured to receive values provided by the at least one PUF device, wherein generating the initial key comprises using the first value as an input to the MAC module to generate the initial key.

In one embodiment, generating the obfuscated key comprises at least one of: concatenating a key with a predetermined pattern of bits; interleaving a first key with an inverted bit pattern of the first key; interleaving a key with pseudo-random bits; concatenating a key with error correction code bits; or concatenating a second key with one or more copies of the second key.

In one embodiment, the stored obfuscated key has an equal number of zero bits and one bits.

In one embodiment, generating the obfuscated key comprises concatenating the initial key with a first pattern of bits.

In one embodiment, concatenating the initial key with the first pattern of bits provides a first key; and generating the obfuscated key further comprises interleaving the first key with a second pattern of bits.

In one embodiment, generating the obfuscated key further comprises interleaving a key with pseudo-random bits.

In one embodiment, generating the obfuscated key further comprises concatenating a key with error correction code bits.

In one embodiment, a non-transitory computer storage medium stores instructions which, when executed on a computing device, cause the computing device to perform a method, the method comprising: generating an initial key using at least one physical unclonable function (PUF); generating an obfuscated key based on the initial key; and storing the obfuscated key in non-volatile memory.

Figure 10:
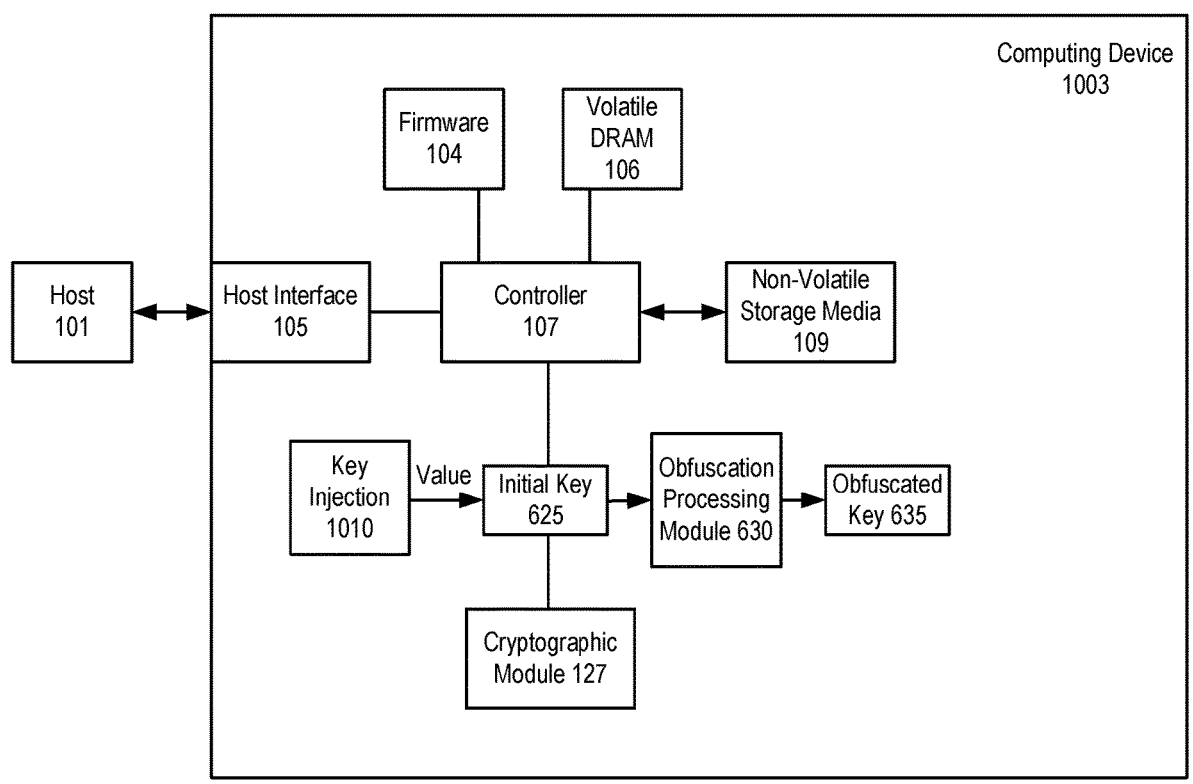
FIG. 10 shows a computing device for generating an initial key based on key injection, obfuscating the initial key, and storing the obfuscated key in non-volatile memory, according to one embodiment.

FIG. 10 shows computing device 1003 used for generating initial key 625 based on key injection 1010, obfuscating the initial key, and storing the obfuscated key in non-volatile memory, according to one embodiment.

In one embodiment, the initial key 625 is generated by using the injected key 1010. For example, initial key 625 is present in a chip by being injected in a factory or other secure environment during manufacture, or other assembly or testing. In this case, the applying processing to increase obfuscation of the initial key is performed by applying obfuscation processing (via module 630) to the injected key (e.g., the value from key injection 1010). In other embodiments, obfuscation processing can be applied to any other value that may be stored or otherwise present on a chip or die.

Variations of Key Generation and Secure Storage

Various additional non-limiting embodiments are now described below. In one embodiment, after (or during) first power up of a system board, a special sequence is activated to turn on the device containing a cryptographic engine (e.g., cryptographic module 127). The sequence further wakes-up the internal PUF and verifies its functionality, then the PUF generates an initial value PUF0, for instance as described above. The PUF0 value is processed by an on-chip algorithm (e.g., by obfuscation processing module 630) and written in a special region of a non-volatile array (out of the user addressable space). In alternative embodiments, instead of the PUF0 value, an injected key is processed by the on-chip algorithm similarly as described below to provide an obfuscated key for storage.

In one embodiment, obfuscation processing is performed to prevent Vdd (voltage) and/or temperature fault hacker attacks. This processing includes concatenating PUF0 with a well-known pattern (e.g., which contains a fixed amount of 0/1 bits). These bits permit, during the life of the device (e.g., chip) when the PUF value is internally read, determining if the read circuitry is able to properly discriminate 0/1 bits. For example, PUF1=PUF0||010101 . . . 01

Next, the result of the above processing (e.g., PUF1) is further embodied with dummy bits (e.g., to avoid Icc hacker analysis). Specifically, for example, the bits of PUF1 are interleaved with an inverted version of PUF1 (i.e., PUF1 bar, which is formed by inverting each bit of PUF1). For example, PUF2=PUF1 interleaved PUF1 bar.

In one embodiment, the rule of interleaving depends on the kind of column decoder (e.g., of a NV non-volatile array) that is present on the chip/device. The device ensures that at each read of the PUF value (from the non-volatile array), the read circuitry processes (in a single shot) the same number of bits from PUF1 and PUF1 bar. This ensures reading the same number of bits at values of 0 and 1, which provides a regular shape in the supply current (Idd).

Next, the bits of PUF2 are further interleaved with pseudo-random bits. In one example, the interleaving depends on the non-volatile array column decoder structure. In one embodiment, the output has the same number of PUF2 bits stuffed with a certain number of pseudo-random bits (e.g., in order to obfuscate an eventual residual correlation that may be present in the PUF2 pattern).

In one embodiment, the pseudo-random bits can be derived from PUF1 or PUF2 by using a hash function. Other alternative approaches can also be used.

In one embodiment, optionally, to reduce or prevent bit loss due to non-volatile aging, the bits of PUF3 are concatenated with error correction code (ECC) bits. In one embodiment, the bits of PUF4 are optionally replicated one or more times (which also extends ECC capabilities). For example, the foregoing may be implemented on a NAND memory. In one example, PUF5=PUF4||PUF4|| . . . ||PUF4

In one embodiment, the value of PUF5 can be written two or more times on different rows and or blocks of a non-volatile memory array.

As a result of the above obfuscation processing, for example, once the final PUF value is written into a non-volatile array block, the value can be used with diminished or no concern about key reliability (e.g., due to noise, or charge loss), or any attempt to infer its value by Idd analysis or forcing its value by Vdd fault attack.

In one embodiment, once obfuscation processing is completed, the PUF circuitry can be disabled. In one embodiment, after disablement, the PUF device can provide values used internally on a device for other purposes (e.g., using a standard read operation inside the non-volatile array).

In one embodiment, key bits are differentiated from random bits when extracting a key from PUF3. For example, internal logic of a device storing a key is aware of the position and method required to return from PUF 5 to a prior or original PUF (e.g., PUF3).

In one embodiment, the bit positions of key bits are known by the device extracting the key. For example, the internal logic of the device can receive one of the intermediate PUF or the final key PUF5, depending on design choice. Then, applying the operation(s) in the reverse order will obtain the original PUF. For example, the processing steps from PUF1 to PUF5 are executed to store the obfuscated PUF in a manner that a hacker would have to both: read the content (e.g., key bits), and also know the operation(s) that were applied in order to get back to and determine the original key.

Closing

A non-transitory computer storage medium can be used to store instructions of the firmware 104. When the instructions are executed by the controller 107 of the memory device 103 or computing device 603, the instructions cause the controller 107 to perform any of the methods discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully-functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method implemented in a computing device, the method comprising:
   generating an initial key based on a value provided by at least one physical unclonable function (PUF);

generating a first key based on concatenating the initial key with a predetermined pattern of bits;
generating an obfuscated key based on interleaving the first key with an inverted bit pattern, wherein the inverted bit pattern is provided by inverting bits of the first key; and
storing the obfuscated key in a non-volatile memory of the computing device.

2. The method of claim 1, wherein generating the initial key comprises using the value as an input to a message authentication code (MAC) to generate the initial key.

3. The method of claim 1, wherein the obfuscated key is stored in the non-volatile memory outside of user-addressable memory space.

4. The method of claim 1, wherein:
interleaving the first key with the inverted bit pattern provides a second key; and
generating the obfuscated key further comprises interleaving the second key with pseudo-random bits.

5. The method of claim 4, further comprising deriving the pseudo-random bits from the first key or the second key using a hash function.

6. The method of claim 4, wherein:
interleaving the second key with pseudo-random bits provides a third key; and
generating the obfuscated key further comprises concatenating the third key with error correction code bits.

7. The method of claim 6, wherein the computing device is a first computing device, the method further comprising sharing at least one of the initial key, the first key, or the third key with a second computing device, and receiving messages from the second computing device encrypted using the shared at least one of the initial key, the first key, or the third key.

8. The method of claim 6, wherein:
concatenating the third key with error correction code bits provides a fourth key; and
generating the obfuscated key further comprises concatenating the fourth key with one or more copies of the fourth key.

9. The method of claim 8, wherein:
concatenating the fourth key with one or more copies of the fourth key provides a fifth key; and
storing the obfuscated key comprises storing a first copy of the fifth key on at least one of a different row or block of the non-volatile memory than a row or block on which a second copy of the fifth key is stored.

10. A system comprising:
at least one physical unclonable function (PUF) device configured to provide a first value;
a non-volatile memory configured to store an obfuscated key;
at least one processor; and
memory containing instructions configured to instruct the at least one processor to:
generate an initial key based on the first value provided by the at least one PUF device;
generate a first key based on concatenating the initial key with a first pattern of bits;
generate the obfuscated key based on interleaving the first key with a second pattern of bits; and
store the obfuscated key in the non-volatile memory.

11. The system of claim 10, further comprising a message authentication code (MAC) module configured to receive values provided by the at least one PUF device, wherein generating the initial key comprises using the first value as an input to the MAC module to generate the initial key.

12. The system of claim 10, wherein generating the obfuscated key comprises at least one of:
concatenating a key with a predetermined pattern of bits;
interleaving the first key with an inverted bit pattern of the first key;
interleaving a key with pseudo-random bits;
concatenating a key with error correction code bits; or
concatenating a second key with one or more copies of the second key.

13. The system of claim 10, wherein the stored obfuscated key has an equal number of zero bits and one bits.

14. The system of claim 10, wherein generating the obfuscated key further comprises interleaving the first key with pseudo-random bits.

15. The system of claim 10, wherein generating the obfuscated key further comprises concatenating the first key with error correction code bits.

16. A non-transitory computer storage medium storing instructions which, when executed on a computing device, cause the computing device to perform a method, the method comprising:
generating an initial key using key injection or at least one physical unclonable function (PUF);
generating a first key based on concatenating the initial key with a predetermined pattern of bits;
generating an obfuscated key based on interleaving the first key with an inverted bit pattern, wherein the inverted bit pattern is provided by inverting bits of the first key; and
storing the obfuscated key in non-volatile memory.

* * * * *